United States Patent [19]

Roberts et al.

[11] Patent Number: 4,859,434

[45] Date of Patent: * Aug. 22, 1989

[54] PRODUCTION OF ENDOTHERMIC GASES WITH METHANOL

[75] Inventors: George W. Roberts, Emmaus; Shivaji Sircar, Wescosville; Paul Stepanoff, Quakertown, all of Pa.

[73] Assignee: Air Products and Chemicals, Inc., Allentown, Pa.

[*] Notice: The portion of the term of this patent subsequent to Aug. 22, 2006 has been disclaimed.

[21] Appl. No.: 205,145

[22] Filed: Jun. 10, 1988

[51] Int. Cl.$^4$ .................. C01B 21/04; C01B 23/00
[52] U.S. Cl. .................. 423/219; 423/245.3; 423/262; 423/351; 423/415 A; 423/437; 423/651
[58] Field of Search ............. 423/262, 219, 245, 580, 423/437, 651, 351, 415 A, 245.3

[56] References Cited

U.S. PATENT DOCUMENTS

| 3,804,756 | 4/1974 | Callahan et al. | 423/245 |
| 4,191,733 | 3/1980 | Swift et al. | 423/245 S |
| 4,304,761 | 12/1981 | Yu Yao | 423/213.2 |
| 4,673,556 | 6/1987 | McCabe et al. | 423/245 |

FOREIGN PATENT DOCUMENTS

| 0068377 | 1/1983 | European Pat. Off. | 423/245 |
| 60-122709 | 7/1985 | Japan | 423/262 |
| 766626 | 9/1980 | U.S.S.R. | 423/245 |

OTHER PUBLICATIONS

"Gold and Platinum Catalyzed Oxidation of Methanol", by Collin N. Hodges and Leonard C. Roselaar, in *Journal of Applied Chemical Bio-Technology*, vol. 25, pp. 609–614, (1975).

"Catalytic Oxidation of Methanol Over Platinum", by J. G. Firth. in *Trans Faraday Society*, vol. 67, p. 212, (1971).

"A Model for Carbon Transfer in Gas-Phase Carburization of Steel", in *Journal of Heat Treating*, vol. 1, No. 4, p. 27, by Kaspersma and Shay.

"Two-Step Accelerated Carburizing Shortens Cycle, Saves Energy", in *Heat Treating*, Jul. 1981, p. 36 by Peartree.

Primary Examiner—Jack Cooper
Attorney, Agent, or Firm—Geoffrey L. Chase; James C. Simmons; William F. Marsh

[57] ABSTRACT

The present invention is directed to a process for producing endothermic gases from methanol and inert gas streams containing minor amounts of oxygen, wherein the oxygen is reacted with stoichiometric excess quantities of methanol over a catalyst as ambient feed temperature conditions without a requirement for external heating of the reaction to produce an endothermic gas containing very low levels of oxygen and methanol and significant quantities of hydrogen, carbon monoxide, water and carbon dioxide.

11 Claims, No Drawings

PRODUCTION OF ENDOTHERMIC GASES WITH METHANOL

TECHNICAL FIELD

The present invention is directed to catalytic conversion of oxygen in inert gases accompanied by the catalytic decomposition of methanol to produce endothermic gases. More specifically, the present invention is directed to the production of high purity endothermic gases for special applications from methanol and inert gases containing minor amounts of oxygen.

BACKGROUND OF THE PRIOR ART

The reaction of methanol and oxygen is known in the prior art. This reaction has been catalyzed by various catalytic species such as platinum, gold and palladium.

In U.S. Pat. No. 4,304,761 various oxidation routes for methanol are set forth including the reaction of methanol with oxygen to produce carbon dioxide and water. In that patent, experiments were conducted to arrive at a system for reducing methanol emissions from internal combustion exhaust gases. Large excesses of oxygen were utilized, wherein the oxygen to methanol ratio was 6.25, which is more than four times the stoichiometric requirement. Complete conversion of methanol requires temperatures of at least 125° C. (257° F.). At temperatures lower than the recited temperature, the methanol oxidized incompletely thus forming formaldehyde byproduct. The patent teaches that in order to get complete oxidation of methanol to carbon dioxide and water one should use stoichiometric excesses of oxygen and temperatures above 125° C., well above ambient conditions. The catalysts demonstrated for activity included platinum, palladium, rhodium and silver.

In an article by Collin N. Hodges and Leonard C. Roselaar entitled Gold and Platinum Catalyzed Oxidation of Methanol appearing in the Journal of Applied Chemical Bio-Technology 1975 vol. 25 pages 609 to 614, the oxidation of methanol under oxygen deficient conditions (oxygen/methanol =0.5 mol fraction) using a platinum gauze catalyst was studied. The article indicates that the lowest reaction temperature of 150° C. (302° F.) resulted in the formation of formaldehyde. It required temperatures of 190 to 225° C. (374 to 437° F.) to produce a hydrogen or carbon dioxide product from methanol oxidation over a platinum catalyst. There is no suggestion in that article that lower temperatures, particularly temperatures approximating ambient, could result in complete conversion of oxygen and methanol.

In another article by J. G. Firth entitled Catalytic Oxidation of Methanol Over Platinum appearing in TransFaraday Society 1971 Volume 67 page 212, the oxidation of methanol was studied under conditions of excess oxygen (oxygen to methanol ratios of 2.5 up to 20) using a platinum catalyst. Some platinum catalyst activity was observed at ambient temperatures of 27° C. (80.6° F.), but at those temperatures methanol conversion was relatively low.

Carburization is a conventional method for case hardening of various ferrous articles, such as steel components. In the typical gas phase carburization technique, a gas atmosphere is utilized which has the capability of transferring carbon to the surface of the steel article being treated, such that the carbon is adsorbed onto the surface of the article and then diffused at appropriate temperatures into the surface zones of the article. Various carbon donating atmospheres have been used in the past including endothermic atmosphere produced from the combustion in a heated catalytic retort under partial oxidation conditions of a hydrocarbon with air to produce a mixture of carbon monoxide, hydrogen and nitrogen. Typically, endothermic atmospheres are produced external to the carburizing furnace and blended with additional hydrocarbon-enriching gas prior to entering the furnace.

It is also known to synthetically produce such an endothermic atmosphere within the carburizing furnace by blending methanol, nitrogen and a hydrocarbon and subjecting the mixture to high temperatures. It is theorized that the carbon monoxide acts as a shuttle for carbon from a high temperature heat source in the furnace to the surface of the ferrous article being treated. The source of the shuttled carbon is the enriching hydrocarbon gas. Such hydrocarbon is cracked under conditions of high temperature in the carburization furnace on the heat source or radiant tubes which are at a higher temperature than the articles being carburized. Water, present as a by-product in the carburization reactions, is believed to combine with the carbon cracked on the high temperature heating surfaces of the carburization furnace to form carbon monoxide and hydrogen. As the carbon monoxide contacts the ferrous articles to be carburized, the carbon monoxide reacts with hydrogen to deposit carbon on the article and result in water as a by-product. Therefore, the presence of carbon monoxide acts to shuttle the carbon of the cracking enriching gas from a high temperature surface in a carburizing furnace to the lower temperature surface of the articles being carburized, wherein the carbon monoxide disassociates to form carbon and oxygen, the latter of which reforms with available hydrogen to form water. It can be seen that in order to accelerate the carburizing effect, carbon monoxide must be readily available to shuttle carbon from the high temperature surface to the carburizing article. It is equally important to provide a carbon source consisting of the enriching gas in order to replenish the carbon utilized from carbon monoxide during the carburization and to allow the water of the carburizing reaction to reach the site of the cracking hydrocarbon so as to form carbon monoxide with such carbon.

This theory of carbon shuttling is set forth in an article by Kaspersma and Shay entitled "A Model For Carbon Transfer in Gas-Phase Carburization of Steel" presented in the Journal of Heat Treating, Vol. 1, No. 4, at page 27.

It is also known to utilize a methanol and enriching gas atmosphere without nitrogen in at least one stage of the carburization process as set forth in an article by Peartree entitled "Two-Step Accelerated Carburizing Shortens Cycle, Saves Energy" presented in Heat Treating, July 1981, page 36. The use of dissociated methanol and enriching gas undiluted with nitrogen in a continuous belt furnace is also discussed. The ratio of enriching gas to methanol was similar to that employed in a conventional carburizing furnace. Accelerated carburizing rates were observed with both techniques. The two-stage process set forth in the article wherein a pure methanolmethane atmosphere is initially used in one stage, while a synthetic endothermic atmosphere is used in a second stage of a carburization process is also the subject of U.S. Pat. No. 4,306,918.

In U.S. Pat. No. 4,317,687, a process for carburizing ferrous metal articles is set forth wherein nitrogen, ethanol and water are injected into the furnace with or without a hydrocarbon enriching agent, such as propane, to produce the carburizing atmosphere.

Patents of additional interest to the carburization art included U.S. Pat. No. 4,145,232 which is directed to a carburizing atmosphere in a furnace wherein the hydrocarbon is maintained in a precise concentration $Z_A$ below the level of 10% so as to minimize the amount of carburizing gas necessary, and U.S. Pat. No. 4,322,255 which is directed to a carburizing atmosphere wherein the atmosphere is measured in the carburizing furnace and the hydrocarbon content is controlled in the range of 0.2 to 30%.

U.S. Pat. No. 4,597,807 discloses using endothermic gases with a protective gas envelope of inert gas.

None of the above prior art suggests the viability of an ambient temperature feed to a reaction of stoichiometric excess quantities of methanol with oxygen content in a commercial inert gas stream, that effectively results in complete conversion of oxygen and methanol to beneficial byproducts of carbon monoxide, hydrogen, carbon dioxide and water without external heating. The present invention achieves such a result using appropriate catalyst to result in an efficient economical endothermic gas producing process as set forth below.

BRIEF SUMMARY OF THE INVENTION

The present invention is a process for producing an endothermic gas comprising an inert gas, carbon monoxide, hydrogen, carbon dioxide and water by reacting an inert gas stream containing a minor amount of oxygen with a stoichiometric excess amount of methanol at a feed gas temperature in the range of approximately 60° to 120° F. in the presence of a catalytic amount of well dispersed, metallic palladium to convert the oxygen and methanol to carbon monoxide, hydrogen, carbon dioxide and water without external heating of the reaction.

Preferably, the oxygen content of the inert gas stream is reduced to no more than 10 ppm oxygen.

In one embodiment, the preferred inert gas is a commercial nitrogen product.

Preferably, the catalyst utilized is palladium dispersed on an alumina support.

Optimally, the oxygen to methanol mol ratio is substantially less than 1.5:1 such that the methanol is in an approximate 45% excess.

Preferably, the initial oxygen content of the inert gas stream is in the range of approximately 0.1 to 10 mol%.

Optimally, the feed temperature is in the range of 60° to 75° F.

Preferably, the catalyst is approximately 0.05 to 1.0 wt% palladium in the metal form with a metal surface area of at least 0.4 m$^2$/g and a palladium dispersion of at least 30.0%.

Optimally, the temperature of the feed to the reactor is approximately 68° F.

Preferably, the space velocity of the reactor is in the range of approximately 0.10 hr$^{-1}$ up to 100,000 hr$^{-1}$.

Optimally, the space velocity of the reactor is in the range of approximately 5,000 hr$^{-1}$ up to 20,000 hr$^{-1}$.

Alternatively, the inert gas stream can initially be saturated with water.

DETAILED DESCRIPTION OF THE INVENTION

An embodiment of this invention is the generation of a so-called "endothermic gas", i.e., a gas containing $N_2$, $H_2$, CO (carbon monoxide) and $CO_2$. Traditionally, a gas of this composition is manufactured in a so-called "endothermic gas generator" or "endo-generator" via the partial combustion of a hydrocarbon fuel, typically a natural gas, with air. Such a gas can also be manufactured via the present invention by adding a stoichiometric excess of $CH_3OH$ to the $O_2$-containing inert gas, with the exact $Ch_3OH$ excess determined by the desired concentrations of CO and $H_2$. The mixed gas is then passed through a catalytic reactor to remove $O_2$ and to decompose unreacted $CH_3OH$ to CO and $H_2$. The effluent from the catalytic reactor is then used directly; there is no need to remove $H_2O$, $CO_2$ or any other component.

Certain processes for the production of inert gases, such as nitrogen and argon, produce a gas that contains low levels of oxygen. Typically, the oxygen content of such streams ranges from about 0.1 mol % to about 5 mol %. Examples of processes that produce such streams are cryogenic distillation of air to produce argon, pressure-swing or vacuum swing adsorptive separation of air to produce nitrogen and membrane separation of air to produce nitrogen. An application of argon and nitrogen in metals processing, such as carburizing, requires an endothermic gas containing carbon monoxide, water and a carbon source. For such applications, the oxygen content of the inert gas stream must be reduced to very low levels, typically less than 10 parts per million. It is also advantageous to convert this oxygen to a necessary reactant such as carbon monoxide or water.

The traditional means to convert the oxygen concentration of nitrogen or an argon stream is via catalytic reaction of the oxygen with hydrogen. Hydrogen is added to the oxygen containing inert gas and the resulting stream is passed through a bed of catalyst, where the hydrogen and oxygen react to form water. This water is then removed from the gas stream by cooling with condensation and further by passing it through a molecular sieve drying system. It is necessary to use a very slight excess of hydrogen relative to the stoichiometric requirement in order to reduce the oxygen concentration in the final product to less than 10 PPM. In practice, hydrogen has several significant advantages for this application. In the first place, hydrogen and oxygen are very reactive. Over certain catalysts, the reaction will proceed rapidly, even when the gas entering the catalyst bed is at ambient temperature. This is a major advantage, since it eliminates the need to preheat the inlet gas. Preheating requires expensive heat exchange equipment and special provisions for start-up. Secondly, water is the only reaction product and as noted above, it can easily be removed from the final product. Small quantities of unreacted hydrogen can frequently be tolerated in the final product. Thus, very little equipment is required downstream of the catalyst bed in order to meet final product specifications. Third, there is little or no catalyst deactivation when hydrogen is used as a reductant, provided the catalyst bed temperature is not allowed to exceed about 700° F. If a carbon containing reductant were used, the catalyst might deactivate rapidly due to coke formation.

However, the use of hydrogen for conversion of oxygen has three important disadvantages, hydrogen cost, hydrogen availability and the lack of a carbon monoxide product. The cost of the hydrogen required for oxygen removal can be a significant fraction of the final price of the inert gas, as high as 25% if the initial oxygen concentration is in the range of a few percent. In addition, if hydrogen is brought to the site of the inert gas, plant in liquid form, an expensive cryogenic storage tank is required. Moreover, in certain parts of the world, hydrogen is not available in sufficiently large quantities to use for this application. Also, from a practical point of view, safe handling of hydrogen can present a problem.

Traditional methods of making endothermic gases require very high temperatures to convert methanol to carbon monoxide and hydrogen per the reaction: $CH_3OH \rightarrow CO + 2H_2$. These temperatures are in the range of 1292° F. to 2102° F. as reported in U.S. Pat. No. 4,322,255.

The present invention provides a process for producing an endothermic gas from methanol and an inert gas, such as nitrogen, containing minor amounts of oxygen by means of the catalytic reaction of oxygen and methanol at much lower temperatures than required for the cracking of methanol. Although it is known that methanol and oxygen will react to form carbon dioxide and water at elevated feed temperatures and at stoichiometric excesses of either oxygen or methanol, the present inventors have surprisingly found that this reaction can be brought about at low feed gas temperatures near ambient conditions of 60 to 120° F. at excess stoichiometric mol ratios of oxygen to methanol of less than 1.5:1 and without any long term significant catalyst deactivation or coking and without any external heating of the reaction.

In a preferred embodiment of the process, methanol is vaporized and mixed with the oxygen containing inert gas. The resulting stream is then passed through a catalytic reactor to promote the reaction:

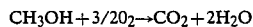

where carbon monoxide and hydrogen are also present in amounts related to the stoichiometric excess of methanol over oxygen. It is believed that hydrogen and carbon monoxide are formed by the decomposition of methanol in conjunction with the oxidation of methanol as shown above.

The inventors have found this reaction proceeds to completion leaving less than 10 ppm of oxygen in the effluent from the catalytic reactor. This is important for an endothermic gas which is used as a reducing gas for carburizing metals. The presence of oxygen would be highly detrimental to the treatment. The effluent from the catalytic reactor contains the original inert gas, less than about 10 ppm of oxygen and up to several mole % each of water, carbon dioxide, carbon monoxide and hydrogen, depending upon the inlet oxygen concentration. Under some circumstances, for instance in the carburizing of metal parts, this gas can be used directly without removing carbon dioxide and water. If removal of both water and carbon dioxide is required, the effluent gas is first cooled to condense a portion of the water and then a single bed of adsorbents can be used to remove carbon dioxide and the remaining water by proper selection of the adsorbent or adsorbents and regeneration conditions. Selective membranes may also be utilized to remove the resulting water and carbon dioxide. Selective absorption may also be used for carbon dioxide removal.

With the exception of hydrogen, methanol appears to be unique in its ability to simultaneously satisfy the following four requirements:

(1) react with low concentrations of oxygen at essentially ambient feed gas conditions without external heating of the reaction,
(2) remove oxygen to very low levels, such as less than 10 ppm to produce an endothermic gas product,
(3) operate for long periods of time without significant catalyst deactivation, and
(4) produce oxidation products that are innocuous and are easily removed from the resulting endothermic gas, if necessary, prior to use of the endothermic gas.

Laboratory experiments of the present invention have illustrated the unique capability of stoichiometric excess amounts of methanol to convert and reduce oxygen to extremely low levels and to produce carbon monoxide, carbon dioxide, hydrogen and water using a palladium catalyst, wherein the feed gas to the reactor was at essentially ambient conditions and no external heat was used for the reaction.

REACTIVITY EXAMPLE

A tubular catalytic reactor was loaded with various catalysts as set forth in Table 1 below. The reactor was constructed and insulated such that it was essentially adiabatic under operating conditions. Nitrogen containing oxygen as an impurity was fed to the reactor at a volumetric rate such that the space velocity of the catalyst bed was approximately 12,400 $hr^{-1}$ (space velocity approximates actual volumetric gas flow rate/volume of reactor occupied by catalyst). The feed oxygen concentration was varied from 0.25 vol % to 2.0 vol % over the course of the various runs as described below. The total pressure was 1 atmosphere absolute and the inlet gas temperature was initially about 70° F. throughout the runs. Initially, the methanol concentration was such that the oxygen/methanol mol ratio was essentially stoichiometric. If no reaction took place with a stoichiometric oxygen to methanol mole ratio at ambient reactor temperature, then a methanol-rich feed was tried in an attempt to initiate reaction. If methanol rich conditions did not lead to reaction, then elevated reactor temperatures were used to attempt to initiate reaction.

RUN #1

A catalyst comprising 0.5 wt % palladium on kaolin pellets was placed in the reactor described above and a feed gas comprising 2.0 mol % oxygen in nitrogen was fed into the reactor. Stoichiometric amounts of methanol were added and no reaction occurred. Next, additional methanol was added to provide a methanol rich stoichiometry without noticeable reaction. The reactor temperature was raised to 200° F. A reaction was noted under these conditions.

RUN #2

A similar run was performed to the above-described Run #1 wherein the oxygen concentration in the feed gas to the reactor was varied over the range of 0.25 to 2.0 mole %. No reaction was obtained at ambient reactor conditions. Additional methanol was added to the feed gas to result in methanol-rich stoichiometries. No reaction was noted under these conditions at a reactor temperature of 70°.

RUN #3

The reactor described above was loaded with the same catalyst as used in RUN #1 but that had been reduced in 5 mole % hydrogen in nitrogen at 200° F. for 30-60 minutes. A nitrogen containing feed gas having an oxygen concentration varying over the range of 0.25-2.0 mole % was introduced into the reactor. The reactor temperature was 85° F. No reaction was noted. Additional methanol was added to the feed gas to result in methanol rich stoichiometries. No reaction was noted under these conditions.

RUN #4

The reactor described above was next filled with DEOXO catalyst comprising 0.28 wt % palladium on alumina pellets obtained from Engelhard Corporation. A feed gas comprising nitrogen with an oxygen concentration of 0.25 mole % was introduced into the reactor wherein the feed gas was further saturated with water. The reactor feed was unheated and at ambient temperature. An initial reaction between the oxygen and methanol was noted wherein the reactor effluent concentration of oxygen was less than 100 ppm.

RUN #5

The reactor described above was next filled with a catalyst comprising palladium nitrate on alumina which was 0.28 wt % palladium on alumina reduced in 5 mole % hydrogen in nitrogen at 200° F. for 30-60 minutes. A nitrogen feed gas containing an oxygen concentration of 2.0 mole % was introduced into the reactor at ambient reactor conditions. No reaction was noted. An excess of methanol over oxygen to methanol stoichiometries was introduced to the feed gas to create a methanol-rich condition. No reaction was noted. The reactor temperature was elevated to 125° F. Again, no reaction was noted.

RUN #6

The reactor described above was filled with an automotive catalyst comprising 0.037 wt % platinum comprising platinum oxide and 0.015 wt % palladium on alumina which was reduced in 5 mole % hydrogen in nitrogen at 200° F. for 30-60 minutes. A nitrogen feed gas containing 2.0 mole % oxygen was introduced into the reactor at ambient reactor temperatures. No reaction was noted at 77° F. for the reactor. Additional methanol was added to the feed gas to produce a methanol-rich feed above the oxygen to methanol stoichiometries. Again, no reaction was noted.

This data derived from these experiments as reported in Table 1 below indicates that only select and specifically prepared catalysts are able to react methanol and oxygen at stoichiometric or excess stoichiometric proportions at ambient feed conditions without external heating of the reactor. The most effective palladium catalysts require a high degree of dispersion and elemental metal form as is represented in the DEOXO catalyst.

TABLE 1

Reactivity Studies of $CH_3OH/O_2$ Mixtures[1] with Various Catalysts

| Run # | Catalyst | Feed $O_2$ Concentration (mole %) | Initial Reactor Temperature (°F.) | Reactive[8] |
|---|---|---|---|---|
| 1 | Pd/Kaolin[2] | 2.0 | 200 | Yes |
| 2 | Pd/Kaolin | 0.25-2.0 | 70 | No |
| 3 | Pd/Kaolin[2][3] | 0.25-2.0 | 85 | No |
| 4 | DEOXO[4] | 0.25-2.0[5] | 68 | Yes |
| 5 | Palladium Nitrate[6] on Alumina | 2.0 | 125 | No |
| 6 | Automotive[7] | 2.0 | 77 | No |

Footnotes:
[1] All Runs were carried out at ambient feed gas temperatures and atmospheric conditions.
[2] 0.5 wt. % Palladium (Pd) in oxide or chloride form on Kaolin pellets, with a metal surface area of 0.56 $m^2/g$ and a palladium dispersion of 26.8%.
[3] Reduced in 5 mole % $H_2$ in $N_2$ at 200° F. for 30 to 60 minutes.
[4] 0.28 wt. % Pd in metal form on alumina pellets, as received from Engelhard Corporation with a metal surface area of 0.42 $m^2/g$ and a palladium dispersion of 33.9%.
[5] Feed gas saturated with $H_2O$.
[6] 0.039 wt. % Pd on alumina, reduced as per Footnote 3 with a metal surface area of 0.06 $m^2/g$ and a palladium dispersion of 33.3%.
[7] 0.037 wt. % Platinum (PtO) and 0.015 wt. % Pd on alumina, reduced as per Footnote 3.
[8] "Yes" if steady-state $O_2$ concentration in reactor effluent was less that 100 ppm.

ENDO GAS EXAMPLE

A tubular catalytic reactor was loaded with DEOXO catalyst and reduced at 200° F. for 60 minutes with a gas comprising 2 vol. % $H_2$ in $N_2$. The reactor was constructed and insulated such that it was essentially adiabatic under operating conditions. $N_2$ containing $O_2$ as an impurity was fed to the reactor at a volumetric rate such that the space velocity of the catalyst bed was approximately 12,400 hr.$^{-1}$ (space velocity ≡ actual volumetric gas flow rate/volume of reactor occupied by catalyst). The $O_2$ concentration was 2.0 vol. % over the course of the run, as described below. The total pressure was 1 atm. abs. and the inlet gas temperature was about 70° F. throughout the run.

The inlet $O_2$ concentration was 2.0 vol. %. The $CH_3OH$ addition rate was set so that about 45% excess of $CH_3OH$, relative to $O_2$, was added to the inlet gas, i.e., about 1 mole of $CH_3OH$ per mole of inlet $O_2$. The reaction initiated spontaneously upon introduction of the $CH_3OH/N_2/O_2$ into the catalyst bed. The $O_2$ concentration in the reactor effluent was between 1 and 5 ppm. at all times during the run, which lasted for 8 hours. There was no evidence of catalyst deactivation during the run, as judged by the lack of variation in the measured reactor effluent composition and the measured reactor temperature.

The concentration of CO in the reactor effluent was about 0.7 vol. % and the concentration of $CO_2$ was about 1.3 vol. %. The effluent $H_2$ concentration was not measured but was probably about 1.3% vol. %

This data illustrates that the process of this invention can be operated with an inlet gas at ambient conditions and with a stoichiometric excess of $CH_3OH$ to produce a weak endothermic gas, without any noticeable deactivation of the catalyst over a period of 8 hours.

Based upon these results, it appears that the preferred catalyst for this process contains between 0.05 and 1.0 wt. % palladium in reduced and a highly dispersed form. The preferred catalyst must have an active surface area (metal area) as measured by $O_2$ chemisorption of at least 0.4 $m^2/g$ and a palladium dispersion of at least 30.0%. Also the preferred catalyst must be in the metallic palladium form. However, other catalysts have at least some activity at other conditions, such as higher temperature.

Appropriate operating conditions for the process of the present invention include an inlet temperature preferably above approximately 60° F. The optimal inlet temperature range is 60 to 75° F. Although an inlet feed gas temperature range of 60° to 120° F. is believed to result in operable conditions, other temperatures are possible, but if the combination of inlet temperature and inlet oxygen concentration is too high, the reaction exotherm will cause permanent damage to the catalyst if the reaction is carried out in a single stage adiabatic reactor. A series of staged catalytic reactors with cooling between each stage can be used to circumvent this problem. In general, within temperature range limitations, higher inlet temperatures produce increased reaction rates. With regard to inlet pressure, it appears that the process is operable over a wide range of inlet pressures. For economic and safety reasons, the pressure should not be less than 1 atmosphere absolute.

With regard to the inlet oxygen concentration, it has been found that the process is operable over a range of inlet oxygen concentrations from about 10 ppm to about 10 mole %. Below about 10 ppm oxygen, there may be a problem in initiating the reaction without external heat. Above about 10 mole % oxygen, the economics of oxygen conversion with methanol become unfavorable and other methods are preferred for lowering the oxygen concentration and producing an endothermic gas. Finally, with regard to space velocity, it appears that the process is operable over a wide range of space velocities (actual volumetric flow rate of gas/volume occupied by catalyst) from 0.10 hr.$^{-1}$ to about 100,000 hr.$^{-1}$ with a preferred range of about 5,000 hr.$^{-1}$ to about 20,000 hrs.$^{-1}$. At very low space velocities, catalyst and reactor costs are excessive. At very high space velocities, fractional conversion of oxygen is diminished and the concentration of oxygen in the reactor effluent will exceed the target level, which is typically less than 10 ppm oxygen.

With regard to the ratio of $CH_3OH$ to $O_2$, the process appears to be operable at $O_2/CH_3OH$ ratios that range from slightly below 1.5:1 to about 1:3 or even lower. At ratios of 1.5:1 or more, an endothermic gas is not produced. At ratios substantially lower than 1:3, the endothermic gas may contain excessive quantities of CO and $H_2$, depending on feed $O_2$ concentration.

As can be seen, the present invention offers a unique and attractive alternative for large scale oxygen conversion and scavenging of inert gas streams and production of endothermic gas. Methanol possesses the same important characteristics that make hydrogen a preferred material for oxygen removal and these characteristics are compatible with endothermic gas production, namely;

(1) it is highly reactive at ambient feed conditions over certain catalysts, without the need for external heating of the reaction, (2) its reaction products are innocuous and are easy to remove from the product stream if necessary, (3) it is effective when employed in stoichiometric excess proportions to the oxygen being converted, and (4) there is no evidence of rapid catalyst deactivation due to coke formation.

The scope of the present invention should be ascertained from the claims which follow.

We claim:

1. A process for producing an endothermic gas comprising an inert gas, carbon monoxide, hydrogen, carbon dioxide and water by reacting an inert gas stream containing minor amounts of oxygen in the range of approximately 0.1 to 10 mole % with a stoichiometric excess amount of methanol at a feed gas temperature in the range of approximately 60° to 120° F. in the presence of a catalyst of approximately 0.05 to 1.0 wt % palladium in the metal form with a metal surface area of at least 0.4 m$^2$/g and a palladium dispersion of at least 30.0% to convert the oxygen and methanol to carbon monoxide, hydrogen, carbon dioxide and water without external heating of the reaction.

2. The process of claim 1 wherein after the reaction of oxygen and methanol the oxygen content of the inert gas is no more than 10 ppm oxygen.

3. The process of claim 1 wherein the inert gas is nitrogen.

4. The process of claim 1 wherein the catalyst is palladium on an alumina support.

5. The process of claim 1 wherein the oxygen to methanol ratio is such that the methanol is 45% in excess of stoichiometry.

6. The process of claim 1 wherein the feed gas temperature is approximately 68° F.

7. The process of claim 1 wherein the reaction has a space velocity in the range of approximately 0.10 hour$^{-1}$ up to about 100,000 hr$^{-1}$.

8. The process of claim 1 wherein the reaction has a space velocity in the range of approximately 5000 hour$^{-1}$ up to 20,000 hour$^{-1}$.

9. The process of claim 1 wherein the inert gas stream is saturated with water prior to the reaction of oxygen and methanol.

10. The process of claim 1 wherein the feed gas temperature is in the range of 60° to 75° F.

11. The process of claim 1 wherein the reaction between oxygen and methanol is performed in one or more fixed-bed catalytic reactors.

* * * * *